No. 860,611. PATENTED JULY 16, 1907.
C. P. SESTER.
SEEDING MACHINE.
APPLICATION FILED MAR. 27, 1906.
2 SHEETS—SHEET 1.
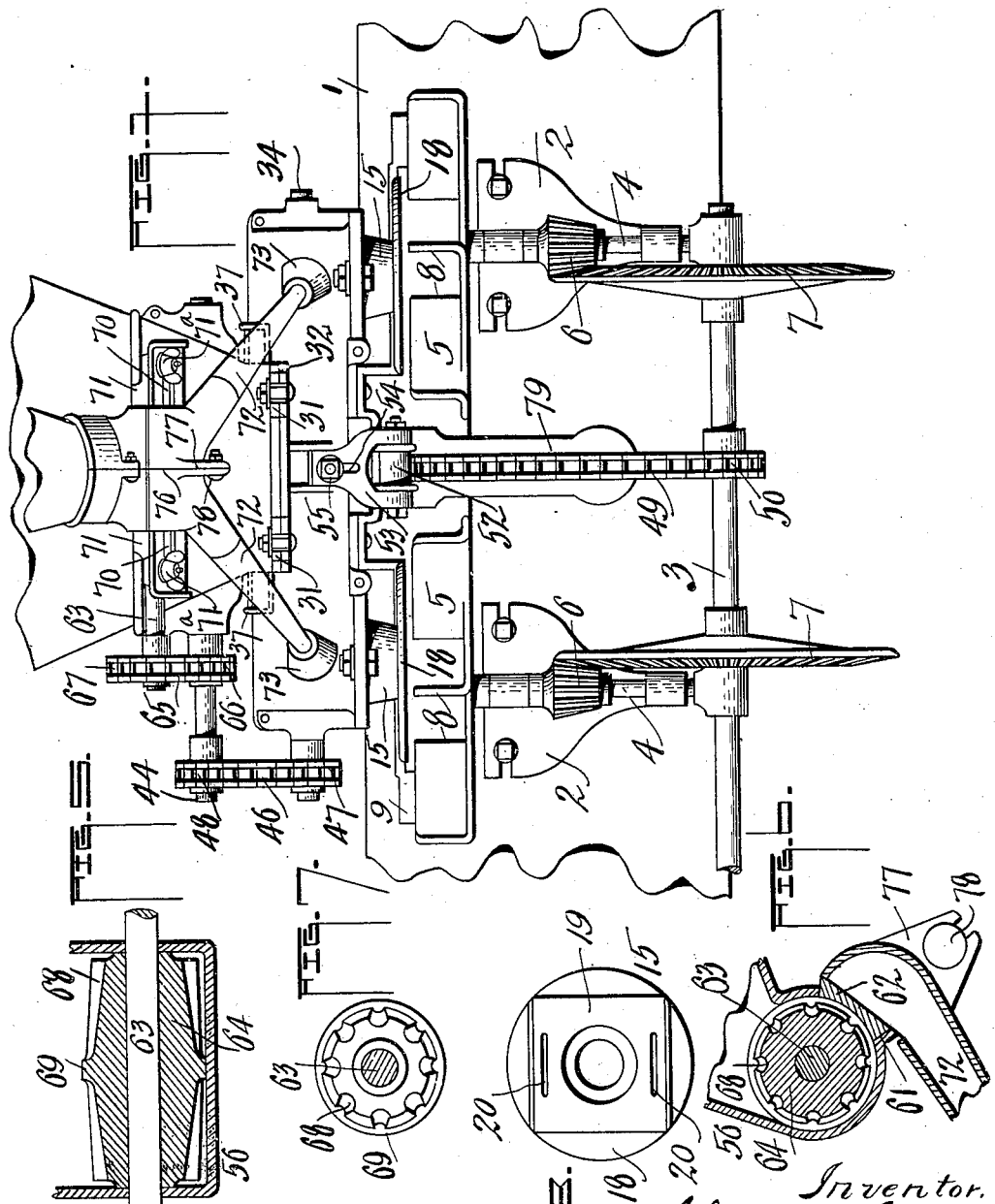
Witnesses:-
Inventor.
Charles P. Sester
By Chas. H. La Ponte
Atty.

No. 860,611. PATENTED JULY 16, 1907.
C. P. SESTER.
SEEDING MACHINE.
APPLICATION FILED MAR. 27, 1906.
2 SHEETS—SHEET 2.
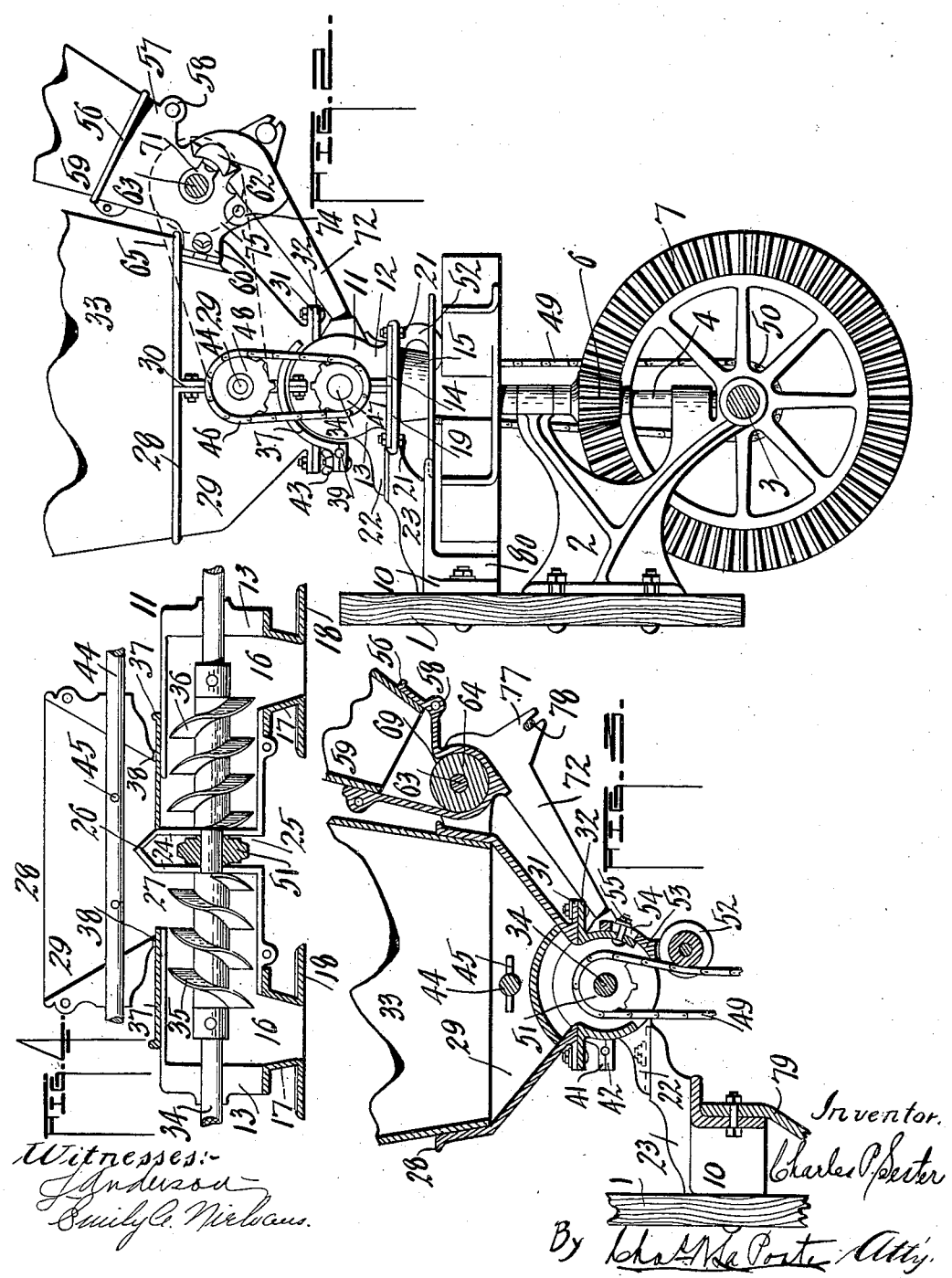

UNITED STATES PATENT OFFICE.

CHARLES P. SESTER, OF PEORIA, ILLINOIS.

SEEDING-MACHINE.

No. 860,611.          Specification of Letters Patent.          Patented July 16, 1907.

Original application filed September 27, 1905, Serial No. 280,249. Divided and this application filed March 27, 1906. Serial No. 308,211.

*To all whom it may concern:*

Be it known that I, CHARLES P. SESTER, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.

This invention has reference to certain new and useful improvements in seeding machines and has particular reference to the general type of broadcast distributers wherein two distributing fans are employed for receiving and distributing broadcast suitable grain or seed.

One of the objects of the invention is combining with two broadcast distributers a right and left auger or screw feed revolubly mounted in a suitable casing and communicating with a hopper adapted to contain grain; and a grass seed attachment containing a suitable feed and provided with diverging spouts from the feed, which at their lower ends communicate with the opposite ends of the casing containing such auger feed.

A further object of the invention, is combining with two fan distributers, a feed consisting of a right and left auger, a casing for containing the said auger and adjustable feed ways attached to the ends of said casing; and to a grass seed attachment having diverging spouts connected at their lower ends with the opposite ends of the auger casing at points above the feed ways aforesaid.

This invention has for its further object a grass seed attachment containing a feed consisting of a fluted roller, the flutes of which diverge from a central point outwardly to the ends of the said roller and are also inclined downwardly from a central point to the outer ends of such roller.

This application is a division of the application filed by me on September 27th 1905, for improvements in seeding machines, bearing Serial Number 280,249.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 1 is an elevation from the rear of a broadcast distributing machine, containing my improvements; Fig. 2 is a side elevation of one side of my improvement but showing the drive shaft in cross section and omitting the driving means for the grass seed attachment, which said driving means is shown in dotted lines; Fig. 3 is a central vertical section through the upper portion of my distributing machine; Fig. 4 is a central transverse section taken through the cylindrical casing containing the right and left auger feed and also showing the adjustable feed ways attached to said casing; Fig. 5 is an enlarged longitudinal section of the fluted feeding roller for the grass seed attachment; Fig. 6 is a cross section through the grass seed attachment, showing the fluted roller, one of the slide-valves and one of the feed spouts attached thereto; Fig. 7 is an end view of the fluted feed roller of the grass seed attachment, and Fig. 8 is a detached view in plan of one of the adjustable feed ways which is attached to the cylindrical casing containing the right and left auger and which is disposed above the fan distributer.

Like numerals of referance indicate corresponding parts throughout the figures.

In the drawings 1 denotes an end-gate, which is of the usual form to which is secured a pair of brackets 2 duplicates of each other, and 3 denotes a drive shaft which has bearing in the lower ends of the brackets 2 as shown.

4 refer to short vertical shafts on the upper ends of which are carried the fan distributers 5, the said shafts being journaled in the brackets 2 as shown and on each of said short shafts is shown bevel pinions 6 which mesh with bevel pinions 7 on the drive shaft 3 by means of which power may be transmitted from the driving shaft 3 to the fan shafts 4. The shafts 4 may be driven in the usual manner by an endless belting connecting a sprocket wheel on one of the ground wheels of a wagon (not shown) on which the said seed distributer is adapted to be supported; and while I have shown and described bevel gearing as a means of transmitting power from the driving to the fan shafts, it is understood that any other and suitable drive may be substituted therefor. The fan distributers 5 just above referred to, are provided with the ordinary shaped wings 8, which stop short of the center of said distributers substantially as shown in the drawings.

9 denotes a combined bracket support and a distributer shield. Laterally adjustable on the support 9 is a substantially circular and elongated casing 11 composed of the semi-circular sections 12 and 13, having webbed portions at their opposite ends by means of which they may be suitably connected together, and the lower portions of said castings at their opposite ends are provided with the flange portions 14, which have secured thereto the feed ways 15 which communicate with openings 16 in the said casing 11. The feed ways 15 consist of short tapered and tubular necks 17 having the lower annular flange or shield 18 and the upper substantially squared flange 19 by means of which the said feed ways may be connected to the flanges 14 of the sections 12 and 13 of the casing 11. To adapt the feed ways 15 to be longitudinally adjusted on the sections of the casings 11, I provide the flanges 19 of the feed ways 15 with the elongated slots 20 to adapt the feed ways to be shifted upon the loosening of bolts 21, which is the means here employed for connecting the feed ways to the casing 11 as described. To adapt the casing 11 to be laterally adjusted on the support 9, I have provided a pair of ears 22, adapted to rest upon and be secured to extensions 23 of the said support 9.

With the arrangement of the casing 11 and the feed ways 15 as above described, I am enabled for purposes to be further set forth, to move the entire casing 11 towards or from the end-gate 1 and also shift the feed ways 15 towards or from the center of the said casing 11.

Describing more fully the construction of the casing 11, the same is provided with a pair of central inner walls or partitions 24, separated from each other a suitable distance forming the open way 25, the said partitions or inner walls 24 having the upwardly inclined or united converging portions 26. When the sections 12 and 13 are connected, the partitions 24 and converging portions 26 unite to form a general partition through the said casing 11 and an overhanging inclosure for the open way 25. For a short distance on each side of the partitions or walls 24 the upper wall of the casing or the sections 12 and 13 thereof is provided with the rectangular cut out portions 27 forming a feed way to the interior casing 11.

Supported by the casing 11 is a hopper support 28 consisting of a pair substantially similar sections or castings 29 having the upper matching webbed portions 30 by means of which they may be connected together, and the said sections overlie a portion of the casing 11 and are provided with slotted ears 31 by means of which they may be bolted or otherwise suitably secured to corresponding ears 32 of the sections 12 and 13 of the casing 11. As here shown the hopper support 28 tapers from its upper outer edge to the casing with which it communicates and supports the hopper 33.

Revolubly carried and longitudinally disposed in the casing 11 and passing through the partitions 24 therein is a shaft 34, and on this shaft is carried right and left augers 35 and 36 adapted to convey material which may be discharged into the casing 11 to the opposite ends of such casing, and discharge it out through the openings 16, therein, to and through the feed ways 15 onto the distributers 6 revolving there beneath. To control the flow of material from the hopper support 28 to the casing 11 through the openings 27 in the upper wall thereof, I have provided slide valves 37, which are longitudinally adjustable on the casing 11, for the purpose of closing either of the openings 27 in the casing 11 substantially as seen in Fig. 4; the said slide valve as will be understood operates through suitable slotted ways 38 in the walls of the section of the hopper support 28. The said slide valves 37 are adapted to be adjustably and slidably carried on a longitudinal rod 39, which may be supported in any suitable manner, from or attached to the casing 11. The means employed for adjusting and securing the slide valves 37 is through the off sets 41 connected to half boxings 42 through the winged nuts and connecting bolts 43, thus it will be seen that the quantity of material which is fed to the auger feed of the casing 11 is governed entirely through the adjustment of the slide valves 37 by means of which more or less material may be allowed to enter the casing 11 through the openings 27 described.

Journaled in the hopper support 28 is an agitating shaft 44 carrying the agitators 45 and such shaft is driven by means of a sprocket chain 46 engaging a sprocket pinion 47 on the shaft 34 and a sprocket pinion 48 on the outer end of such agitating shaft. And the mode of transmitting motion or power to the auger shaft 34 is by means of a chain drive 49 engaging a sprocket wheel 50 on the driving shaft 3, and passing up intermediate the two distributing fans 6, operates through the open way 25 of the casing 11 and engages a sprocket pinion 51 on the shaft 34 between the matching walls or partitions 24 of the said casing 11.

Operating the auger shaft in the manner in which I do, by means of a driving chain extending up intermediate the distributing fans, obviates the obstruction of the cast of grain or other material from the fan distributers, which would be the case if the drive were arranged to connect the outer end of either end of the auger shaft 34; and through the provision of the converging wall 26 of and partitions 24 I provide a shed or inclosure for the pinion 51 and a drive chain 49 and form a feed way together with the openings 27 in the casing 11 to adapt an easy flow of material from the hopper and its support to the interior of the casing 11. I have provided a guide and chain tightener for the drive chain 49 see Fig. 3 consisting of a sheave wheel 52, which is carried by a depending bracket 53 adjustably supported on the outer section 12 of the casing 11. The said bracket 53 has a concave face adapted to match the convex surface of the section 12, so that in the adjustment of said bracket and the sheave wheel thereon, the said sheave wheel may be adjusted toward and from the chain. The upper end of the bracket is slotted as at 54 to adapt it for adjustment when the bolt 55, which supports the same is loosened.

The devices, that is the feeding devices, which have been referred to are employed mainly for conveying grain, such as oats, wheat, and etc from a hopper to distributing fans for discharging broadcast over a field. I will now describe a grass seed attachment for conveying such seed from a hopper to the point of the casing 11 where the grain is discharged into a feed way from which it is deposited onto the fan of the distributers, at which point the grass seed and grain is mixed before its discharge onto the distributers.

56 refers generally to a hopper support consisting of the matching sections 57 suitably secured together through the ears 58. The said sections support a hopper 59 and are provided with ears 60 by means of which they may be bolted or otherwise suitably secured to one of the sections 29 to the hopper support, see Fig. 2. The sections of the hopper support 56 are provided with an open way 61 controlled by oppositely movable slide valves 62, and extending through the said hopper support and journaled in the opposite walls thereof is a short shaft 63, on which is revolubly mounted a fluted force feed roller 64 and the drive for the said shaft 63 is through a sprocket chain 65 engaging a sprocket pinion 66 on the agitating shaft 44, and a sprocket pinion 67 carried on the shaft 63. See Fig. 1 for front elevation and Fig. 2 for side elevation, however, in the latter view the drive is shown in dotted lines.

Referring to the force roller 64 the same is provided with oppositely projected fluted portions 68 divided by a central flange or partition 69. The flutes of the fluted portions 68 taper downwardly from the flange portion 69 to the outer ends of the said roller and the outer ends of the flutes are flared or in other words the walls of the flutes converge from their greatest widths which is at the ends of the roller to the central flange or partition thereof where they are in very close proximity to each other; it is preferable to have the flutes substantially semi-circular or concave as shown in Figs. 6 and 7. The object of providing a fluted force feed roller where the flutes thereof taper from a central point downwardly and outwardly to the ends of the said roller is to gradually increase the feed of material from the hopper through the force feed roller to the feeding devices heretofore described. The feed of the material being regulated by the adjustment of the slide valves 62, which, if moved outwardly a short distance will allow a small quantity of material to be discharged by the fluted roller and as the slide valve will move further outwardly, it will be seen that the flow of material will rapidly increase, owing not only to the openings in the valves but through the exposure of the flutes the widths and depths of which increase toward their outer ends. The slide valves 62 are slotted as at 70 and move adjacent to brackets 71 extending out from the sections 57 of the hopper support 56 through which the shaft 63 is carried and the same are adjustably held by means of the winged nuts and bolts referred to generally as 71ª.

Attached to the hopper support 56 is a pair of depending and diverging spouts 72, preferably tapered as shown in the drawings and having their lower ends seated in the tubular bosses 73 projecting out from the sections 12 of the casing 11, at or near their opposite ends and preferably at points where material is conveyed through the spouts 72 will be discharged above the feed ways 15, of the opening 16 in the casing 11 to insure the co-mingling of the grass seed and grain. The upper ends of the spouts 72 are secured in position to receive seed from the hopper 56, when the slide valves 62 are opened, by means of ears 74 which are adapted to ears 75 forming a part of a hopper support section 57. The upper ends of the spouts 72 where they unite are provided with matching walls 76 which lie in juxtaposition with each other, and have the extending ears 77, which are bolted together as shown at 78.

The object of adjusting the casing 11 on its support or the feed ways 15 on the said casing, is to regulate the feed of grain and grass seed onto the fan distributers.

If its found that the cast of the material from the distributers is too much to one side or the other, then the feed ways 15 will be adjusted longitudinally of the casing 11. If the cast of the material is too near the board, then the casing 11 will be adjusted on the support 10. By this means I am enabled to discharge the material onto the distributers at desired points and also regulate the cast from such distributers, and for this purpose, I prefer to employ fan distributers having wings substantially as shown.

As a supplemental support for the support 10 and the parts carried thereby, I have provided the brace 79 as shown.

The bracket support 9 was referred to as a support and distributer shield, the shield portion being indicated as 80 and a substantially semi-circular shape depending from the support 9 at the rear of the fan distributers.

Having thus fully described my invention, what I claim and desire to secure by Letters Patent of the United States, is:—

1. In a seeding machine, the combination of a fluted force feed roller, the flutes of which are inclined downwardly and have side walls which converge from the outer end of such roller inwardly.

2. In a seeding machine, a force feed fluted roller provided with two sets of fluted portions divided by an annular flange, the flutes thereof inclined downwardly from the said flange and the walls of such flutes converging from the outer ends of said roller to the flange thereof.

3. In a seeding machine, a force feed fluted roller provided with two sets of fluted portions divided by an annular flange, the flutes thereof being substantially concave and inclined downwardly from the said flange, and the walls of such flutes converging from the outer ends of said roller to the flange thereof.

4. In a seeding machine, the combination of a pair of distributing fans, a receptacle, a fluted force feed roller revolubly carried in said receptacle, the said roller provided with two sets of fluted portions divided by an annular flange, the flutes of said roller inclined downwardly and flared outwardly towards the outer ends of said roller, spouts connected with the said receptacle and adapted to deliver the material therefrom onto each of said fans, and valves for controlling the delivery of the material from the receptacle by the roller to the said spouts.

5. In a seeding machine, the combination of a pair of distributing fans, a receptacle supported above and intermediate said fans, a pair of spouts depending and diverging from said receptacle and having their discharge ends located above the fans, a fluted force feed roller revolubly mounted in the receptacle having flutes which are inclined downwardly and have side walls which converge from the outer end of such roller inwardly, means for operating the roller, means for operating the fans, and means for controlling the delivery of material from the receptacle into the spouts.

In testimony whereof I affix my signature, in presence of two witnesses.

CHARLES P. SESTER.

Witnesses:
CHAS. N. LA PORTE,
J. M. ANDERSON.